United States Patent [19]
Clark

[11] Patent Number: 5,806,737
[45] Date of Patent: Sep. 15, 1998

[54] CARGO CARRIER FOR MOTOR VEHICLES

[76] Inventor: Michael E. Clark, Rte. 7, Box 968, Quicy, Fla. 32351

[21] Appl. No.: 658,612

[22] Filed: Jun. 5, 1996

[51] Int. Cl.$^6$ ........................................................ B60R 9/06
[52] U.S. Cl. .......................... 224/509; 224/521; 224/524; 224/527; 224/528; 224/485
[58] Field of Search .................................... 224/509, 528, 224/521, 519, 520, 524, 525, 526, 527, 529, 530, 502, 485

[56] References Cited

U.S. PATENT DOCUMENTS

| | | | |
|---|---|---|---|
| 3,650,443 | 3/1972 | Haskett et al. | 224/520 |
| 3,891,132 | 6/1975 | Chandler | 224/502 |
| 4,915,276 | 4/1990 | Devito | 224/521 |
| 4,976,386 | 12/1990 | Geiger | 224/509 |
| 5,439,151 | 8/1995 | Clayton | 224/509 |
| 5,497,927 | 3/1996 | Peterson | 224/519 |
| 5,520,315 | 5/1996 | Graham | 224/530 |
| 5,544,799 | 8/1996 | Didlake | 224/519 |

*Primary Examiner*—Linda J. Sholl
*Attorney, Agent, or Firm*—Enrique G. Estevez, Atty.

[57] ABSTRACT

A cargo carrier designed to be mounted adjacent to and onto a vehicle by attaching it to the vehicle's trailer hitch having a crossbar and a receiver. The cargo carrier has a substantially S-shaped tongue having a male bracket that couples with the receiver on the trailer hitch, thereby mounting the cargo carrier onto the vehicle. The male bracket is held in the receiver by means of a pin. An elongated frame, having a fixed arm and a swing-out arm which is constructed of essentially parallel beams and connected to said fixed arm by a pivot hinge, is integral with and is supported by said tongue. The fixed arm is reinforced by frame support members connecting said arm with the tongue. Load support brackets are carried on the swing-out arm and serve to mount a cargo holder device thereupon, the cargo holder device being a box with a lid, an open bin, or any other desired device. The swing-out arm of the frame may be moved to its open position away from the vehicle to allow access to the vehicle or it may be returned to its closed position adjacent to the vehicle and secured with the latch provided, in preparation for travel. The cargo carrier is additionally fastened to the trailer hitch by lateral stabilizers that connect the fixed arm of the frame with the crossbar of the trailer hitch, said stabilizers being adjustable in tension, thereby restraining the cargo carrier from exhibiting side sway as might be induced by a load imbalance.

12 Claims, 6 Drawing Sheets

CARGO CARRIER FOR MOTOR VEHICLES

BACKGROUND—FIELD OF INVENTION

The present invention relates generally to cargo carriers designed to be temporarily installed on a vehicle, and, more particularly, related to a cargo carrier coupled to and supported by the receiver of an existing trailer hitch mounted on the vehicle, said cargo carrier also providing lateral stabilizers that attach to the trailer hitch structure and a carrier frame that pivots away from the vehicle, thereby allowing better balancing of the load, as well as unimpeded access to the vehicle's rear storage compartment or trunk.

BACKGROUND—DESCRIPTION OF PRIOR ART

Motor vehicles are often used to transport not only passengers but also cargo such as luggage, groceries, merchandise, trade tools, sports equipment and other items. Almost since their inception, motor vehicles have been provided by their manufacturers with some space dedicated to the transportation of such cargo, for example, trunk space in an automobile. Often, however, there is need for cargo space in addition to that normally available within the vehicle itself. A number of devices providing such extra cargo space are well known and in wide use, including roof racks, rooftop carriers, cargo trailers, and such. Each of these devices has its own disadvantages.

Roof racks and rooftop carriers, for example, are inconvenient to load and unload because the load must be lifted up to the top of the vehicle, also limiting the weight of the article which may be safely loaded. In addition, because these rooftop devices disturb the aerodynamics of the vehicle, they contribute to reduced fuel economy. Also, they reduce the vertical clearance of the vehicle to the degree that they increase its height. Further, it is difficult to use a rooftop device for carrying items to which frequent access will be required, since it is very inconveniently located to reach, load and unload.

Cargo trailers overcome many of the inconveniences encountered with rooftop cargo devices, however there are other considerations. Cargo trailers are required to pay license plate fees, which increases cost for the owner. Cargo trailers must be equipped with tires, which will eventually have to be replaced, and which may experience a flat or fail in some other manner, requiring a spare tire. Trailers have axles, wheel bearings, tail lights and perhaps other mechanical and electrical components which require maintenance and eventual replacement. All these factors greatly increase the cost for the owner.

Because many motor vehicles are often outfitted with a trailer hitch, an alternative means of carrying cargo has been developed by way of various carrier devices which mount onto the trailer hitch mechanism, thereby being suspended above the road and usually behind the motor vehicle. These devices provide the advantages of easy accessibility for loading and unloading, reduced aerodynamic drag because they are directly behind the vehicle and suspended off the road, and, with some, the ability to carry heavier loads than with rooftop carriers. While cargo trailers are able to handle the heaviest loads, a hitch-mounted cargo carrier will handle a heavier load than a rooftop carrier or roof rack, and offers a number of advantages over a cargo trailer. For example, a hitch-mounted carrier requires no license plate or tires and has no components that demand mechanical maintenance. Several hitch-mounted cargo carriers have been recently patented in the U.S.

U.S. Pat. No. 5,094,373, issued to Lovci on Mar. 10, 1992, discloses a rack attachable to a vehicle by mounting onto the vehicle's trailer hitch. This rack is intended for carrying sports equipment and is disposed with various attachments, each specifically designed for its intended cargo. The rack may be disposed with a single or multiple bicycle carrier, a carrier attachment for skis, or an attachment to carry two fuel cans plus a spare tire. Lovci's rack is constructed such that the entire carrier may be pivoted away from the rear of the vehicle, thus allowing access to the vehicle's integral cargo area. Lovci's cargo rack does not allow for transportation of a cargo box and does not provide for increased lateral stability, as provided by the present invention.

U.S. Pat. No. 5,114,120, issued to Bartelt, Belson and Bruno on May 19, 1992, discloses an equipment mounting system for carrying plows, hoists, winches, and the like, mounted on the outside of a motor vehicle. Bartelt's device is mountable onto a trailer hitch or other mounting point on the vehicle and pivots away from the vehicle, so that the equipment may be more easily put to use and to allow access to the vehicle's rear cargo area. Bartelt's device is not intended to carry a variety of cargo, as is the present invention. While Bartelt's device pivots away from the rear of the vehicle, it does not provide a cargo carrier with increased lateral stability, as herein disclosed.

U.S. Pat. No. 5,413,260, issued to McFarland on May 9, 1995, discloses a cargo carrier for a van. The carrier is mounted onto and supported by the ball of an existing trailer hitch. McFarland's carrier is designed specifically for a fill bodied van and is not a cargo carrier intended for an automobile, pickup truck or utility sport vehicle, as the present invention is designed for. In addition, McFarland's cargo carrier is also not intended to pivot away from the rear of the vehicle as the carrier herein does. Further, McFarland's carrier provides no lateral stabilizers to reduce side sway of the cargo carrier, as provided in the invention herein.

U.S. Pat. No. 5,443,189, issued to Hirschfeld on Aug. 22, 1995, discloses a vehicle mounted carrier usable for a variety of articles. Hirschfeld's carrier is designed to be attached to the vehicle by mounting onto the receiver of an existing trailer hitch. While this carrier is to be mounted onto an existing trailer hitch, as is the present invention, Hirschfeld's device is not intended to carry heavy loads, is not provided with any means of lateral stabilization, nor does it pivot away to allow unimpeded access to the vehicle's rear cargo area, in contrast to the present invention.

U.S. Pat. No. 5,439,151, issued to Clayton on Aug. 8, 1995, discloses a cargo carrier attachment for a vehicle. Clayton's cargo carrier is designed to be mounted onto the receiver of an existing trailer hitch and to pivot away from the vehicle, such that access to the vehicle's rear cargo area is unimpeded. Clayton's device incorporates a specially designed container that fits onto the carrier and, unlike the present invention it cannot accomodate a variety of commonly available containers for cargo. In addition, the structure of Clayton's cargo carrier frame, with its single member, U-shaped jaw, is inherently weak and provides insufficient support for the load both during travel and as the carrier is pivoted away from the rear of the vehicle. In contrast, the present invention incorporates a swing-out arm upon which to mount a cargo carrier and which comprises two essentially parallel elongated members which are cross-connected by reinforcing brackets. This parallel beam construction provides exceptional load bearing strength, both during travel and while swung open away from the vehicle, and will support much more weight than the Clayton U-shaped jaw. Further, Clayton's structure provides no lateral support for the cargo box and, therefore, does not prevent side sway when the load in the cargo carrier is improperly balanced or shifts during travel. The present invention is designed with several advantages over Clayton: lateral stabilizers that will prevent side sway when the load shifts or is improperly positioned; a structure that provides better support for the cargo box when pivoted away from the vehicle; and a carrier adaptable to a variety of cargo, including boxes of varying sizes and styles.

U.S. Pat. No. 5,454,496, issued to Sumida and De Los Santos on Oct. 3, 1995, discloses a load carrier for supporting bicycles and the like, which mounts onto the receiver of a trailer hitch. Sumida's device allows the carrier to pivot away from the vehicle to aid access to the trunk. It also allows transportation of bicycles while also towing a boat trailer. While Sumida's device is intended to carry bicycles, the present invention allows carrying a box which may be differently designed for various purposes, such as a cargo container, cooler, dog kennel, tool box, boat dock box, field kitchen, emergency medical station, etc, The structure and design of Sumida's carrier does not lend itself to transport of heavy loads, or to serve a variety of needs.

OBJECTS AND ADVANTAGES

Accordingly, several objects and advantages of the present invention are:

- to provide an improved cargo carrier for motor vehicles;
- to provide a cargo carrier that is easy to mount onto the vehicle;
- to provide a cargo carrier that swings out of the way, allowing for easy access to the vehicle's own cargo compartment;
- to provide a cargo carrier that may be disposed with cargo holders of varying size, shape and adaptable to a variety of functions, for example, a cargo box, a cargo bin, a cargo shelf, or a cargo rack;
- to provide a cargo carrier that allows for unobstructed view by the driver of the vehicle;
- to provide a cargo carrier that withstands adverse road and climatic conditions;
- to provide a cargo carrier that may be easily secured against theft of the carrier or its cargo;
- to provide a cargo carrier that minimally affects the vehicle's aerodynamic drag, thereby providing maximum fuel efficiency while transporting a load,
- to provide a cargo carrier which may be disposed with appropriate reflectors or lights that will meet local highway ordinances;
- to provide a cargo carrier that is easy to manufacture, yet provides a strong, useful and durable product for the consumer;
- to provide a cargo carrier with interchangeable load platforms suitable for transportation of cargo numerous other articles, including sports equipment, lawn and garden tools, household goods and the like,
- to provide a cargo carrier attachable to the rear of a motor vehicle by mounting onto an existing trailer hitch and which provides added anti-theft protection when locked in its closed position, by obstructing access to the vehicle's rear cargo area;
- to provide a cargo carrier that eliminates road noises and rattles through the use of lateral stabilizers and a latch mechanism which secures the swing-out arm under tension in a closed position,
- to provide a cargo carrier attachable to a motor vehicle by mounting onto an existing trailer hitch and which provides for increase lateral stability through easily attachable lateral stabilizers, thereby solving the unappreciated problem of side sway produced by a load imbalance, and mechanical stress caused by inertia.

These and other objects and advantages will become apparent through the disclosure made herein.

DESCRIPTION OF DRAWINGS

FIG. 8 includes several detail views of the latch mechanism securing the frame in the closed position and providing a padlock eye for locking the frame.

8*a* is a top plan detail.

8*b* is a front elevation detail.

8*c* is a side elevation detail.

8*d* is a rear elevation detail.

LIST OF REFERENCE NUMERALS 4 typical trailer hitch crossbar
6 trailer hitch receiver
10 S-shaped tongue
12 male bracket
14 frame
16 fixed arm
18 swing-out arm
19 swing-out arm hinge
20 load support bracket
22 cargo holder
24 latch
28 lateral stabilizers
28*a* lateral stabilizer bracket
28*b* lateral stabilizer member
28*c* lateral stabilizer bracket adapter for closed end crossbar
32 frame support member
34 load support bracket reinforcement member
36 latch handle
38 vertical latch hinge
40 horizontal latch hinge
42 latch retainer bracket
44 padlock ring
46 latch retainer arm
48 latch stop bracket

SUMMARY

The present invention relates to a cargo carrier designed to be attached to a vehicle predisposed with a trailer hitch having a crossbar and a receiver. In the preferred embodiment the cargo carrier has an S-shaped tongue having a male bracket that couples to the trailer hitch's receiver and is restrained therein by means of a pin. The tongue supports an elongated frame having two ends and comprising a fixed arm and a swing-out arm joined to the fixed arm through a pivot hinge located at one end of the frame. The swing-out arm comprises two substantially parallel members, or beams, cross-connected by brackets for added strength. A latch is located at the opposite end of the swing-out arm from the pivot hinge and serves to secure the swing-out arm in the closed position, as required for travel. Load support brackets are mounted onto the swing-out arm and provide a place of attachment for an overlying cargo holder. Each load support bracket is further supported by a reinforcement member connecting the load support bracket to the lower beam of the swing-out arm. The cargo holder, attachable to the load support brackets on the swing-out arm, may be one of a variety of devices, for example, a box with a lid, an open bin or any other device of the user's choosing. In addition, the cargo carrier is disposed with at least two lateral stabilizers, which connect the fixed arm, preferably at its ends, to the crossbar on the trailer hitch. The lateral stabilizers are adjustable in tension, so that they may be tightened so as to cause the frame to be restrained and to resist road rattles and side sway such as is caused by an imbalanced load. The swing-out arm of the frame may be opened by swinging it away from the vehicle, thereby allowing access to the vehicle's cargo area. For travel, the frame is moved to its closed position and securely latched in place; a common padlock may be added for security.

DESCRIPTION AND OPERATION OF THE INVENTION

Figure 1:
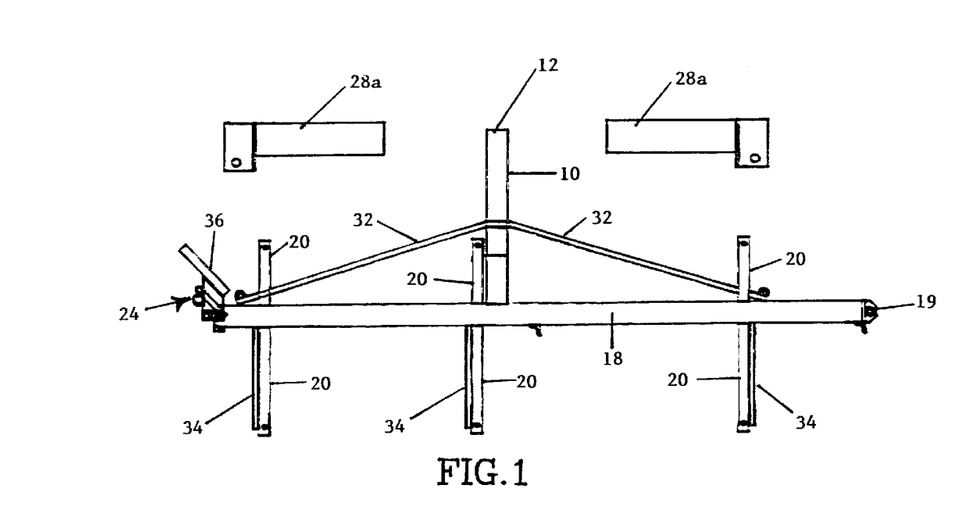
FIG. 1 is a top plan view of the cargo carrier.
Figures 2, 3:
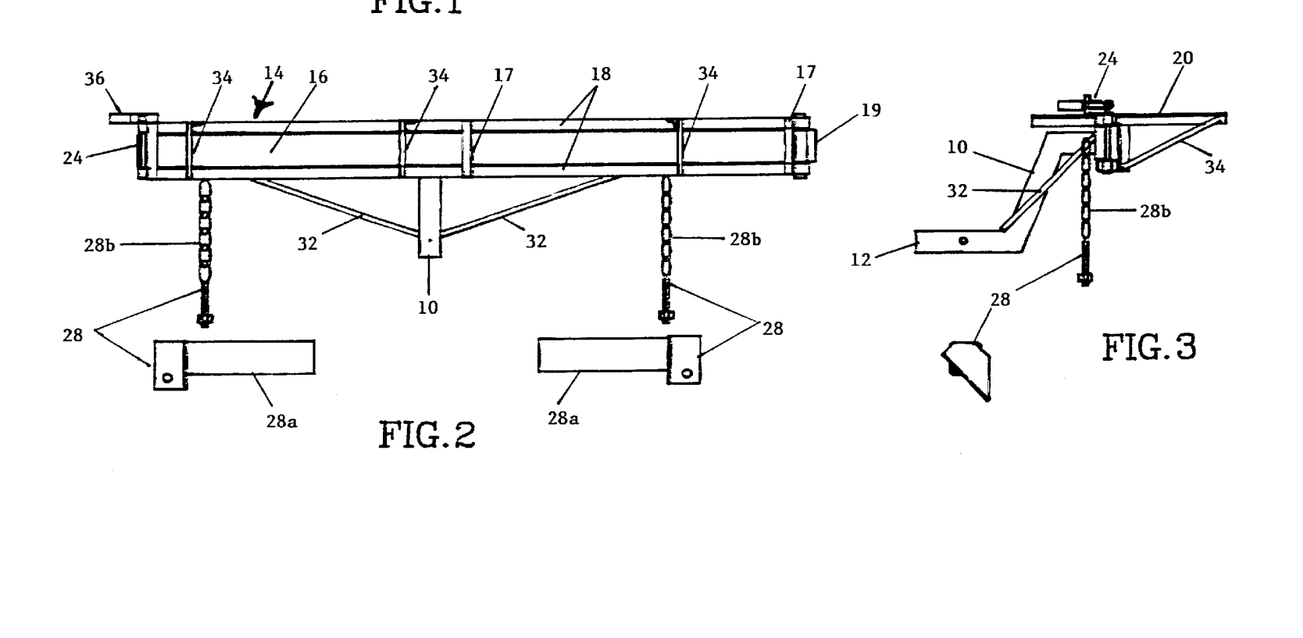
FIG. 2 is a rear elevation view of the cargo carrier.
FIG. 3 is a side elevation view of the cargo carrier.
Figure 4:
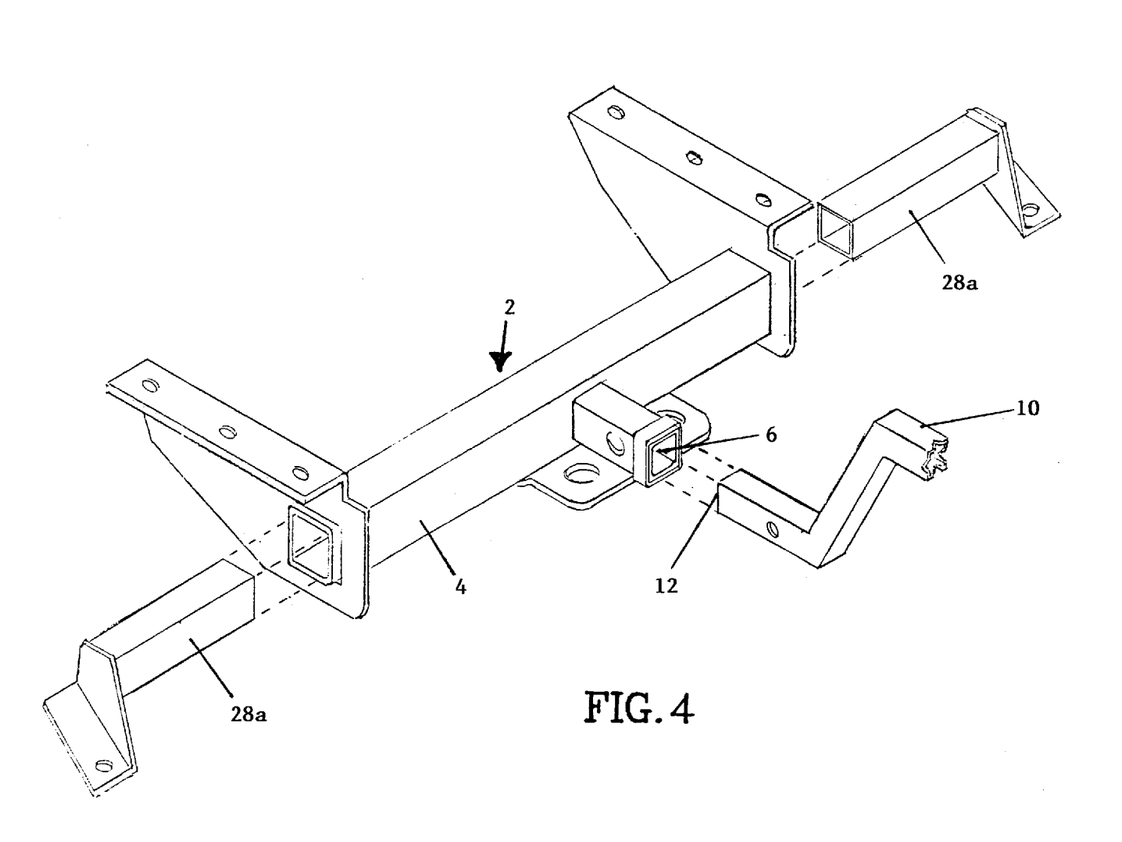
FIG. 4 is a view of the typical rear-mounted trailer hitch showing how the tongue and lateral stabilizers are attached.
Figure 5:
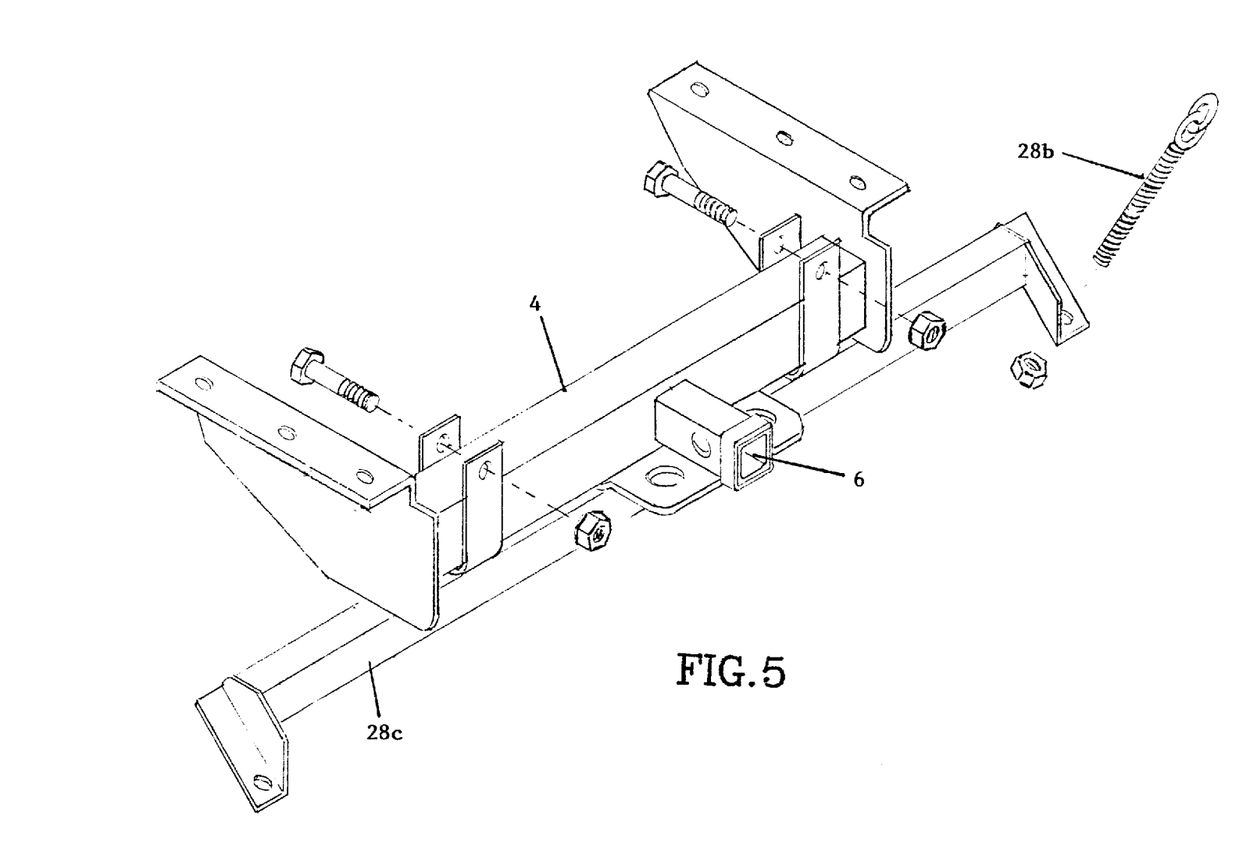
FIG. 5 is an alternate embodiment incorporating an adapter for attachment of the lateral stabilizers to a trailer hitch with a closed-end crossbar.
Figure 6:
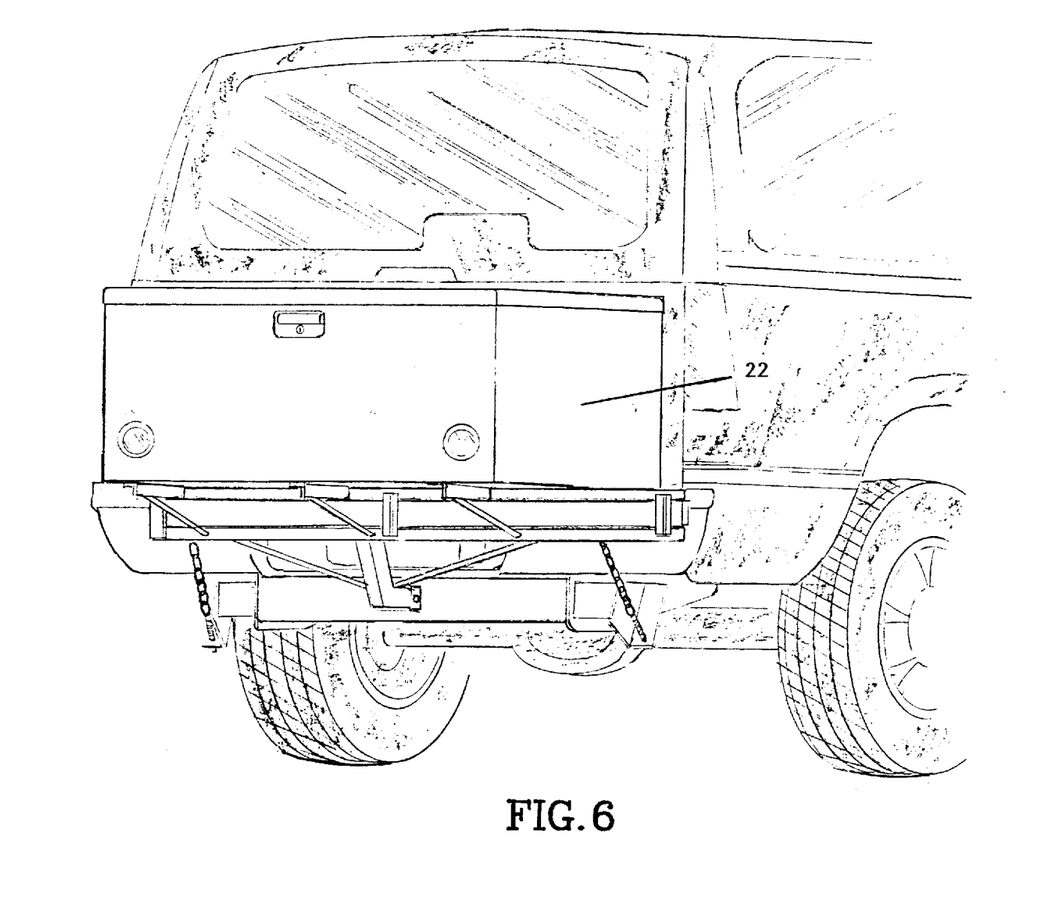
FIG. 6 is a view of the cargo carrier, mounted at the rear of a vehicle, with a typical cargo box installed thereon.
Figure 7:
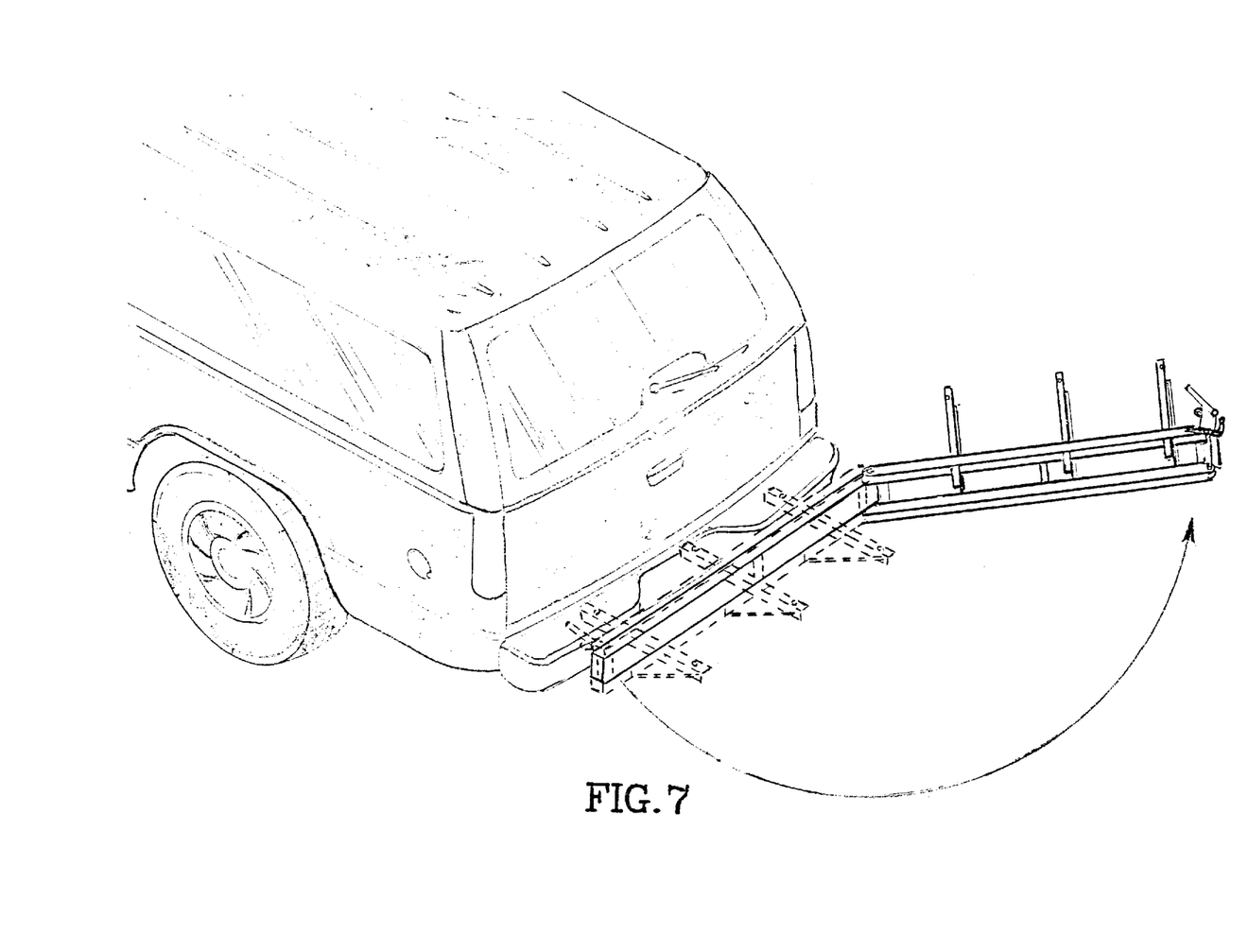
FIG. 7 is a perspective view of the cargo carrier, mounted at the rear of a motor vehicle, showing how the carrier frame swings from a closed to an open position.
Figure 8A:
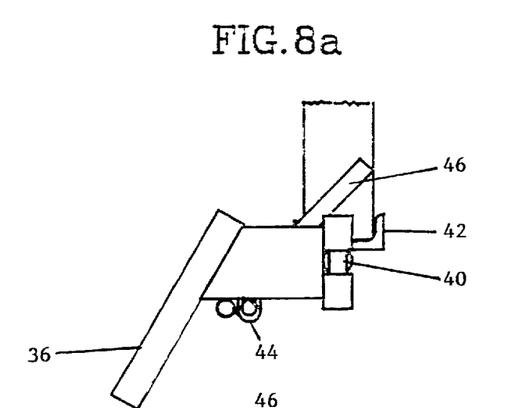
Figure 8B:
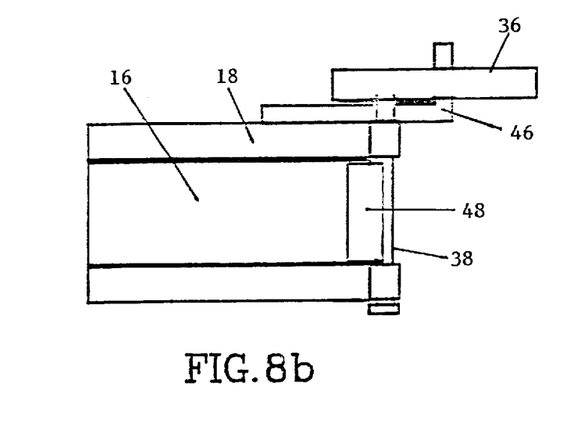
Figure 8C:
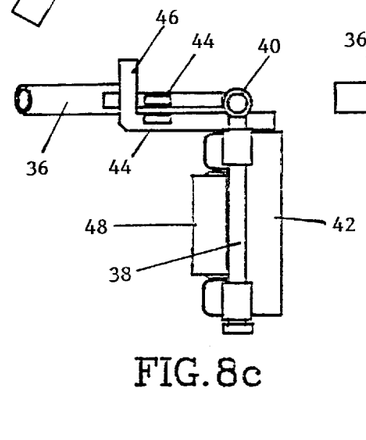
Figure 8D:
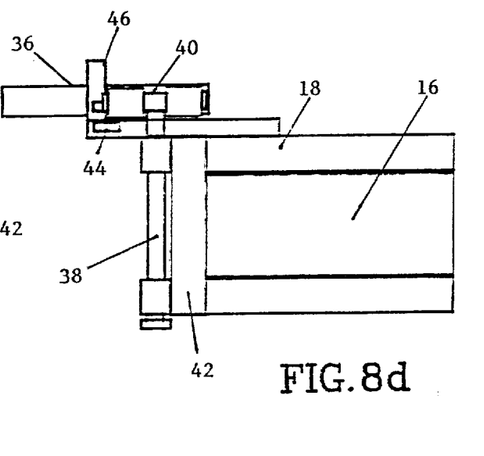

The cargo carrier herein disclosed is designed to be attached to a vehicle having a trailer hitch 2 that comprises a crossbar 4 and a receiver 6 which houses a removable hitch ball coupler. Once the hitch ball coupler is removed, the receiver on the trailer hitch is available for installation of the cargo carrier thereon. The cargo carrier has no wheels and is usually carried behind the vehicle and suspended off the road surface by being mounted onto the trailer hitch. FIGS. 4–6.

In the preferred embodiment the main components of the cargo carrier are: an S-shaped tongue 10 having a male bracket 12 which engages the receiver 6 on the trailer hitch 2, thereby mounting the cargo carrier adjacent to the vehicle, above the roadbed and substantially parallel to the trailer hitch; an elongated, substantially horizontal frame 14, integral with and supported by the tongue, comprising a fixed arm 16, a swing-out arm 18 comprising essentially parallel beams which are cross-connected by reinforcing brackets 17 and a hinge 19 connecting said arms and acting as a pivot between the arms; load brackets 20 which are mounted on the swing-out arm 18, perpendicular to its axis, and which serve to support a cargo holder device 22, which may be one of several interchangeable devices, such as a box with a lid, an open bin, a shelf, or a rack, depending on the user's preference, a latch 24 that serves to secure the swing-out arm 18 to the fixed arm 16; two stabilizers 28, comprising lateral stabilizer brackets 28a and lateral stabilizer members 28b connecting the fixed arm 16 of the frame 14 to the crossbar 4 of the vehicle's trailer hitch 2, thereby providing increased resistance to side sway exhibited by the cargo carrier when there is a load imbalance; and two lateral frame support members 32, connecting the S-shaped tongue 10 to the fixed arm 16, thereby providing added resistance to side sway. Details of the cargo carrier and its various component parts are depicted in FIGS. 1–5, 7 and 8.

A load imbalance may be caused by improper loading of the cargo holder or by a load shift during travel. Such load imbalances tend to cause side sway in the cargo carrier, particularly when the vehicle makes a turn. The induced side sway produces a rotational force, or torque, acting on the coupling between the carrier and the trailer hitch, thus creating mechanical stress, with accompanying heat. Side sway also creates stress on the frame of the cargo carrier, as well as on any cargo container mounted thereon; such stress will contribute to reducing the useful life of the cargo carrier due to mechanical failure. Further, the heavier the load deposited on the cargo carrier, the larger the torque that will be induced.

In addition to the problem of torque induced by load imbalance, there is a further problem associated with forces acting upon the cargo carrier. It has been well known, since Newton, that a body at rest tends to remain at rest, and a body in motion tends to remain in motion. These forces operate on cargo carriers as well. When the vehicle begins to move, the cargo carrier possesses a certain inertia which must be overcome. In overcoming the inertia of the cargo carrier, a force acts on the tongue-receiver coupling, tending to puff that coupling apart. In contrast, when the vehicle comes to a stop after being in motion, the converse occurs. The cargo carrier tends to remain in motion and a force acts upon the tongue-receiver coupling, tending to further push that coupling together. These forces, which cause various stresses on the cargo carrier, the trailer hitch and the vehicle, have been an unappreciated problem in construction of these cargo carriers, until the present invention. To counteract and overcome these forces, the present cargo carrier is provided with lateral stabilizers 28 and frame support members 32. The lateral stabilizers 28 connect the fixed arm 16 of the swingable frame to the crossbar 4 of the trailer hitch in such a manner as to reinforce the cargo carrier against these effects. The frame support members 32 connect the S-shaped tongue 10 diagonally to the fixed arm 16 of the swingable frame. The lateral stabilizers 28 and frame support members 32 counteract these forces, create a more stable cargo carrier, save wear and tear on the tongue-receiver coupling and on the cargo carrier frame, permit carrying a heavier load in the cargo holder device and allow for more agile vehicle performance, while helping prevent side sway of the cargo carrier due to a load imbalance. No previous attempt at designing a similar cargo carrier has effectively dealt with this problem.

For attachment to the vehicle the male bracket 12 is disposed in the receiver 6, thereby coupling the cargo carrier to the trailer hitch and mounting the cargo carrier adjacent to the vehicle. The lateral stabilizers 28 are then attached, connecting the fed arm 16 of the frame to the crossbar 4 and providing increased stability to the cargo carrier.

The selected cargo holder device may have been pre-installed onto the cargo carrier frame or it may be installed after mounting the frame on the vehicle. One very useful and versatile cargo holder will be a box with a lid. This cargo holder may take a variety of embodiments, including a tool box; an insulated cooler, a dog kennel suitable for transport of hunting dogs, an emergency medical kit, a field kitchen, veterinary supply box, for example on a farm, an equipment box for scientific field work, etc. The possibilities are endless. Other cargo holders that may be adapted to this cargo carrier include an open bin, a shelf, or a rack, such as for bicycles.

Once loaded, the cargo holder may be swung away from the vehicle by moving the swingable frame to its open position, allowing easy access to the rear cargo area of the vehicle, be it an automobile trunk or a truck tailgate. The parallel beam design of the swing-out arm is sufficiently strong to support well over 150 lbs. of cargo in its open position, depending on the strength of its components. For support of heavier loads still, the swing-out arm may be disposed with a folding leg which may be deployed for support when the arm is moved to its open position.

For travel, the swing-out arm is moved to the closed position and the latch is engaged to lock the swing-out arm onto the fixed arm, thereby securely holding the assembly in its closed position. The latch is designed such that a common padlock may be added to help prevent unauthorized opening of the swingable frame, thereby also hindering access to the vehicle's cargo area. In the closed position, the parallel beams of the swing-out arm engage the fixed arm by straddling it, the reinforcing brackets 17 acting as stops to properly position the beams, one above and one below the fixed arm. This arrangement provides exceptional strength and allows carrying heavy loads.

What is claimed is:

1. A cargo carrier, attachable to a vehicle predisposed with a trailer hitch having a crossbar and a receiver, said cargo carrier comprising:

mounting means comprising a substantially S-shaped tongue having a male bracket fitting into said receiver, thereby to attach said cargo carrier to said trailer hitch, to elevate said cargo carrier above the male bracket and to further separate the cargo carrier from the vehicle;

restraining means for releasably securing said male bracket within said receiver;

a frame carried on said mounting means, said frame comprising a fixed arm, a swing out arm comprising a plurality of substantially parallel beams, cargo support means carried on said swing-out arm for bearing a load, and a pivot hinge connecting said swing-out arm with said fixed arm, said swing-out arm being thereby pivotably swingable from a closed position adjacent to the vehicle to an open position away from the vehicle; wherein two of said plurality of substantially parallel beams are vertically spaced one above the other and straddle said fixed arm in said closed position;

a cargo holder device mounted on said cargo support means;

closure means, borne on said frame, for securing said swing-out arm in the closed position; and a plurality of stabilizer means for providing said cargo carrier with resistance to side sway.

2. The cargo carrier of claim 1 wherein said restraining means further comprises a pin.

3. The cargo carrier of claim 2, wherein said closure means further comprises a latch.

4. The cargo carrier of claim 3, wherein said stabilizer means further comprises at least two frame support members connecting said fixed arm to said tongue.

5. The cargo carrier of claim 4, wherein said stabilizer means further comprises at least two lateral stabilizers each having a member releasably and adjustably connecting said fixed arm to said trailer hitch, thereby imparting resistance against side sway to said cargo carrier.

6. The cargo carrier of claim 5, wherein said cargo holder device further comprises a box having at least one opening.

7. The cargo carrier of claim 6, wherein said box further comprises a movable cover thereon.

8. The cargo carrier of claim 5, wherein said cargo support means further comprises a plurality of load support brackets, whereupon said cargo holder device may be mounted.

9. The cargo carrier of claim 7, further comprising a plurality of bracket support members for reinforcing said load support brackets.

10. The cargo carrier of claim 9, wherein said cargo holder device further comprises a box having at least one opening.

11. The cargo carrier of claim 10, wherein said box further comprises a movable cover thereon.

12. A cargo carrier attachable to a vehicle predisposed with a trailer hitch having a crossbar and a receiver, comprising:

a substantially S-shaped tongue having a male bracket fitting into said receiver and releasably secured therein by a pin;

a frame carried on said tongue, said frame comprising a fixed arm, a swing-out arm and a pivot hinge connecting said swing-out arm to said fixed arm, said swing-out arm being thereby movable from a closed position adjacent to the vehicle to an open position away from the vehicle, said swing-out arm further comprising a plurality of parallel beams and a plurality of load support brackets; wherein two of said plurality of parallel beams are vertically spaced one above the other and straddle said fixed arm in said closed position;

a box mounted on said load support brackets, said box having at least one opening and at least one movable cover;

a latch borne on said frame for securing said swing-out arm in the closed position;

a plurality of frame support members connecting said fixed arm with said tongue, thereby providing further strength and stability to said frame;

a plurality of lateral stabilizers, each comprising a member for releasably and adjustably connecting said fixed arm to said trailer hitch, thereby providing said cargo carrier with resistance to side sway.

* * * * *